Dec. 23, 1941.  W. F. DALZEN  2,267,692
METHOD OF CUTTING AND FINISHING GEAR TEETH
Filed July 31, 1931  2 Sheets-Sheet 1
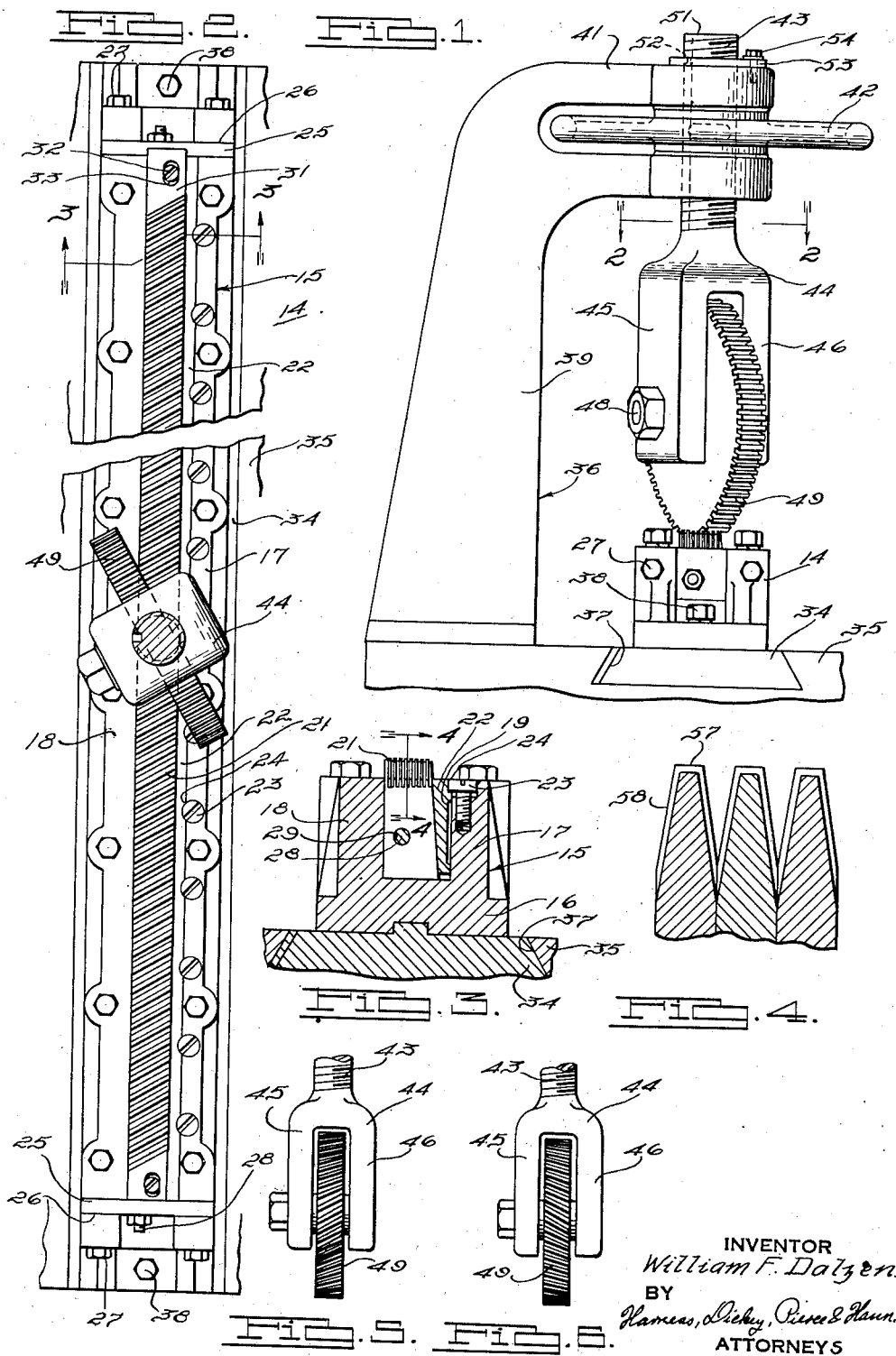
INVENTOR
William F. Dalzen.
BY
Hamess, Dickey, Pierce & Haun.
ATTORNEYS Dec. 23, 1941.   W. F. DALZEN   2,267,692
METHOD OF CUTTING AND FINISHING GEAR TEETH
Filed July 31, 1931   2 Sheets-Sheet 2
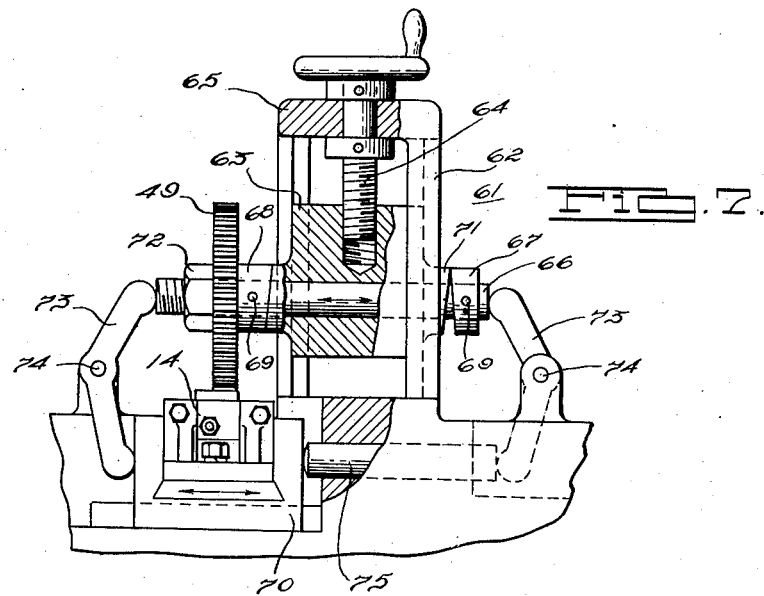
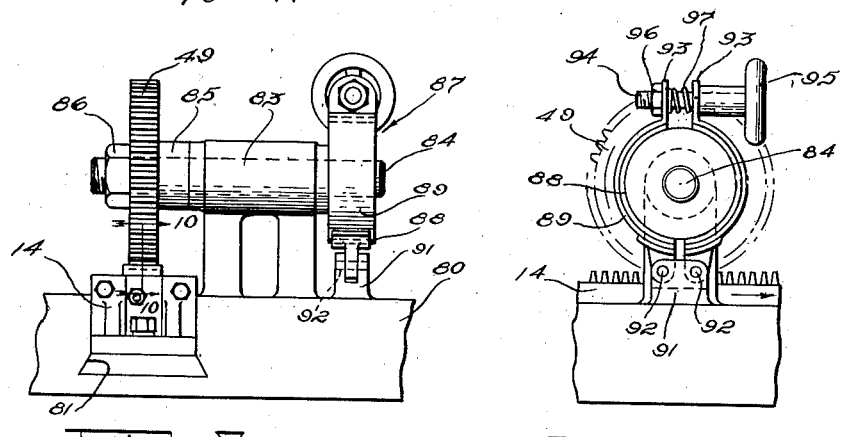
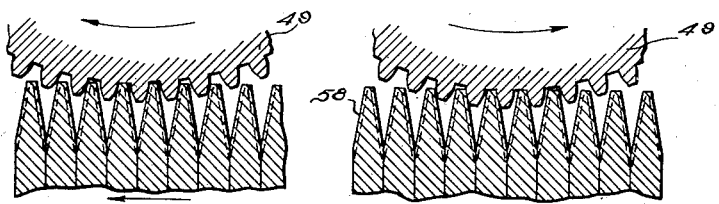
INVENTOR
*William F. Dalzen.*
BY
*Harness, Dickey, Pierce & Hann.*
ATTORNEYS Patented Dec. 23, 1941

2,267,692

UNITED STATES PATENT OFFICE 2,267,692

METHOD OF CUTTING AND FINISHING GEAR TEETH

William F. Dalzen, Grosse Pointe, Mich., assignor, by mesne assignments, to Michigan Tool Co., Detroit, Mich., a corporation of Delaware Application July 31, 1931, Serial No. 554,193

5 Claims. (Cl. 90—1.6)

This invention relates to gears and particularly to the method of cutting and finishing teeth on a gear blank through the rolling of the gear relative to the cutter during the time the teeth thereof are moved laterally relative to each other.

It has been the practice heretofore to cut teeth on gear blanks by a tooth generating operation wherein the cutter and the gear blank are rotated in timed relation. Expensive machines, which were extremely accurate, were employed for supporting the cutters and the blanks in an attempt to eliminate errors in the tooth profile and spacing. While the errors are reduced to a minimum, nevertheless, owing to the variation in the hardness of the material at different points about the gear blank, and also because of slight machine errors which are impossible to eliminate, the spacing and the profile of the teeth are not entirely uniform when generated by the present known methods.

When my cutting tool is employed, a gear may be generated which is extremely accurate because of the accuracy with which my tool may be constructed and operated. The profile of the teeth of the cutting tool may be constructed to be exactly the same on both sides and the spacing is, in like manner, made to be exact, so that the gears which are finished by my cutting tool will accurately mesh therewith and with each other. The employment of my cutting tool eliminates any machine errors from effecting changes in the tooth contour or spacing, as the errors of the machine cannot be introduced between the cutter and gear blank. For this reason the expensive machine above referred to, need no longer be employed for gear tooth generation and an extremely simple and inexpensive machine may be utilized for effecting the manipulation of my gear cutter.

When a formed cutter or grinding wheel is employed for generating teeth on gears, the teeth formed thereby are inaccurate because the cutters for grinding wheels are only approximate in contour below the base circle which is well known to be within the working depth of the gear teeth. My present cutter reaches to the full tooth depth and accurately machines a correct profile, regardless of the gear diameter, pitch or pressure angle, and regardless of whether or not the base circle is larger or smaller than the diameter of the gear at the bottom of the tooth gap. It will be further apparent that the teeth of a gear will remain in contact with a greater number of teeth on my cutting tool than will be in contact with a second gear generated in like manner by the tool, and interference between the teeth of the two gears will be impossible.

Accordingly, the present invention has for its main objects: the method of machining teeth on a gear blank which are of accurate predetermined contour and spacing throughout the entire periphery of the gear; the method of employing a cutting tool for machining teeth on gears which effects an arcuate, lateral movement between the teeth when the cutter and gear are moved longitudinally when in meshed relation; the provision of a machine which supports a gear relative to a cutter in such manner as to effect a lateral movement both to the cutter and the gear blank as the blank is rotated relative to the cutter; to provide a machine and cutter which supports a gear blank against rotational movement up to a predetermined pressure which is effected through the engagement of the surface on one side of the teeth of the cutter with the surface on the roughed out teeth of the gear for machining a profile on one side of the gear each time the cutter is reciprocated; and, in general, to provide a method for machining a gear which rapidly cuts the teeth to accurate dimensions through the arcuate lateral movement provided between the teeth of the cutter and those of the gear effected on a machine which is simple in construction and operation and which provides an exceptionally fine finish on the sides of the teeth which are of extremely accurate dimensions.

Other objects and features of novelty of my invention will be either specifically pointed out or will become apparent when referring, for a better understanding of my invention, to the following description in conjunction with the accompanying drawings, wherein:

Figure 1 is a view in elevation of a gear cutting machine embodying features of my invention, Fig. 2 is a broken sectional view of the structure illustrated in Fig. 1, taken on the line 2—2 thereof, Fig. 3 is a sectional view of the structure illustrated in Fig. 2, taken on the line 3—3 thereof, Fig. 4 is an enlarged sectional view of the structure illustrated in Fig. 3, taken on the line 4—4 thereof, Fig. 5 is a broken view of a portion of the structure illustrated in Fig. 1 showing a gear as cut by a modified form thereof, Fig. 6 is a view similar to Fig. 5 showing a further modified form of gear cut by structure embodying my invention, Fig. 7 is a broken view, partly in section and partly in elevation, of a modified form of a machine for cutting teeth on a gear blank, Fig. 8 is a broken view in elevation of a further modified form of machine for cutting teeth in a gear blank in accordance with my invention, Fig. 9 is an end view of the structure illustrated in Fig. 8, Fig. 10 is an enlarged sectional view of the structure illustrated in Fig. 8, taken on the line 10—10 thereof with the cutter moving in one direction, and Fig. 11 is an enlarged view of the cutter and gear, similar to that illustrated in Fig. 10, with the cutter moving in the opposite direction.

In my co-pending application, Serial No. 554,192 filed on even date herewith, and assigned to the assignee of the present invention, I have illustrated a cutting tool which is made up from a plurality of blades upon the ends of which teeth are provided of predetermined contour, having cutting edges disposed on the sides of the teeth and in some instances across their top edges. The teeth are disposed in rows, which may be extended laterally or angularly across a channel shaped holder, in which the blades are retained in fixed predetermined relation to form the cutting tool. The disposition of the teeth in the holder is opposite to the disposition of the teeth on the gear blanks, that is to say when laterally disposed teeth are provided on the gear, such as those on a spur gear, the teeth in the cutter are angularly disposed, while in the case of a spiral gear, the teeth of the cutter are laterally disposed.

Referring to Figs. 2, 3 and 4, the cutter includes a channel shaped body portion 15 having a base portion 16 and upstanding side portions 17 and 18 which form a central recess 19. A plurality of blades 21 are disposed in the recess 19 either laterally or angularly relative to the upstanding side portions 17 and 18, as pointed out above. A wedge member 22 engages sloping sides of the blades 21, as illustrated in Fig. 3, and is drawn downwardly in the recess by a plurality of screws 23, the heads of which engage recesses 24 provided in the wedge member. End plates 25 are disposed in slots 26, provided in the ends of the upstanding portions 17 and 18, for closing the ends of the recess 19 when supported in fixed relation to the holder 15 by bolts 27. A bolt 28 extends through aperture 29 provided through the blades, as illustrated in Fig. 3, for supporting the blades on the end plates 25. A wedge member 31, having a sloping surface in engagement with a sloping surface of one of the plates 25, forces the blades 21 into intimate longitudinal relation when a screw 32, disposed in an elongated aperture 33 in the wedge member, is tightened.

The cutter 14 is attached to a slidable plate 34 of truncated conical section, the sloping sides of which are retained in a dovetailed recess 37 provided in a base plate 35 of a machine 36. Suitable mechanism (not shown) is employed for reciprocating the slidable plate 34 and, therefore, the cutter 14, which is retained by bolts 38 in fixed relation to the plate. An arm 39 projects upwardly from the base plate 35 having a laterally extending portion 41 on its upper end, which is bifurcated to receive a hand wheel 42 through which a threaded end 43, of a gear blank supporting member 44, extends. The turning of the hand wheel 42 raises and lowers the member 44 relative to the cutter 14, for positioning the gear blanks relative to the teeth of the cutter.

The lower end of the member 44 is bifurcated, having downwardly extending side portions 45 and 46 through which aligned apertures extend for receiving a spindle 48 for supporting a gear blank 49 in the space between the downwardly extending portions 45 and 46 for rotational movement on the spindle.

One side of the threaded end 43 of the member 44 is grooved at 51 in which an inwardly extending tenon 52 of a washer 53 registers, for the purpose of angularly positioning the member 44 relative to the cutter 14. A screw 54, extending through a slot in the washer 53, is tightened to draw the washer into fixed relation to the top surface of the extending portion 41 of the projecting member 39. I have illustrated in Figs. 1 and 2, a spur gear 49 supported by the member 44 with the laterally disposed teeth thereof in mesh with the teeth 21 of the tool 14. The teeth of the cutting tool 14 are disposed at an angle for the purpose of having the gear blank disposed angularly relative to the movement of the cutter for effecting a relative lateral movement between the teeth of the cutter and gear for machining the sides of the gear teeth when the cutter is moved longitudinally.

The hand wheel 42 is operated to force the gear blanks 49 into intimate contact with the teeth of the cutter 14, after which the cutter is reciprocated during the time additional pressure is applied to the gear blank through the further downward movement of the member 44 effected by the operation of the hand wheel 42. When the center of the spindle 48 has moved downwardly until it is disposed a predetermined distance above the cutting teeth, the gear is then machined to a predetermined diameter having teeth of accurate predetermined shape and dimensions.

As pointed out in my above mentioned co-pending application, the cutting of the teeth is effected by the cutting edges provided on the sides of the teeth of the tool. The cutting edges are formed by a plurality of grooves disposed vertically or angularly in the tooth sides when a finishing operation is to be effected on roughened teeth of a gear blank. When the entire cutting operation is to be performed by my machine, that is to say, when the teeth are to be roughed and finished by my cutting tool, I provide additional grooves across the top edge of the teeth, as illustrated in Figs. 3 and 4, for effecting cutting edges 57 at the top of the teeth in addition to the cutting edges 58 provided on their sides. The angular disposition of the gear blank relative to the movement of the cutter effects a lateral movement between the engaging sides of the teeth during the rotation of the blank, through its longitudinal movement or that of the cutter, to machine the sides of the gear teeth as they pass across the cutting edges 57 and 58 of the cutter teeth.

In Figs. 5 and 6 I have illustrated right and left hand spiral gears, that is to say, gears having angularly disposed teeth which may slope in either direction as shown in the figures. When spiral gears of this type are to be cut by my cutting tool, I dispose the blades 21 laterally across the channel shaped member 15 and likewise angularly dispose the gear blank when supported by the member 44, to have the teeth of the blank register with the teeth of the cutting tool. The angular disposition between the gear blank and the cutter effects the lateral movement between the teeth of the cutter and the blank for accurately machining the sides of the teeth of the gear into predetermined tooth formation.

As pointed out in my foregoing application, when the cutting edges 57 are provided on the top of the cutting teeth, the gear blank may be mounted directly upon the member 44 without first roughing out teeth in the periphery thereof, the roughing operation being effected by the cutting edges 57 and 58 of the cutter. While a complete cutting operation for machining teeth in the gear blank may be effected by my cutting tool, it is to be understood that the tool operates more efficiently in finishing the teeth after they have first been roughed out by a hobbing or like cutting operation.

In Fig. 7 I have shown a further modified form of my invention which includes a machine 61 which is constructed in such manner as to mechanically effect a lateral movement between the gear blank and the cutting tool. A slide 62 carries a block 63 which is adjustable vertically in the slide by a lead screw 64 which is supported for rotation in a cross member 65 mounted on the top of the slide 62. The block 63 carries a rotatable shaft 66 on the ends of which oppositely disposed cams 67 and 68 are mounted in fixed relation by pins 69. Bosses 71 are provided on the sides of the block 63 having oppositely sloping surfaces which alternately engage the sloping surfaces of the cams 67 and 68 in such manner as to reciprocate the shaft 66 longitudinally during each rotation thereof. A gear blank 49 is mountable in fixed relation to the shaft 66 by a nut 72.

The longitudinally slidable cutter 14 is mounted in a carriage 70 which is so disposed relative to the machine 61 as to be movable laterally relative to the gear blank 49. Rocker arms 73 are pivoted to upstanding lugs on the base of the machine by pins 74 in such manner as to have the upper arms thereof in engagement with the ends of the shaft 66 and the lower arms thereof in engagement with the sides of the carriage 70 through the medium of a slidable shaft 75, for transmitting the longitudinal movement of the shaft 66 to the carriage.

As the cutter 14 is moved longitudinally the gear 49 is rotated, which rotation rotates the shaft 66 which is moved longitudinally to the left through the actuation of the cam 68 by the sloping surface of the boss 71, as viewed in the figure. The movement of the shaft to the left operates the rocker arm 73 to move the carriage 70 to the right which combines the lateral movement between the teeth of the blank and the teeth of the cutting tool, to rapidly machine the gear teeth to accurate dimension as the gear is rolled across the teeth of the cutter 14. The laed screw 64 is adjusted vertically to move the block 63 downwardly and the gear 49 into continued intimate engagement with the cutter teeth until the gear teeth are cut to predetermined form.

When the arms 73 are omitted the lateral movement between the teeth is effected through the longitudinal movement of the shaft 66 without laterally moving the carriage. In like manner the cams may be positioned in a predetermined manner to move the carriage 70 laterally of the gear blank 49 to provide the lateral motion for dressing the sides of the teeth without laterally moving the shaft. It is to be understood that other types of machine may be employed for effecting the lateral movement between the teeth of the cutter and those of the gear, the one herein shown being employed primarily for the purpose of illustration for disclosing a method for accurately machining teeth on gear blanks.

Referring to Figs. 8 to 11 inclusive, I have illustrated a further modified machine and method for finishing the sides of teeth of a gear. In Figs. 8 and 9 the bed plate 80 of the machine is provided with a slot 81 in which the cutting tool 14 is moved longitudinally of its length and with an upstanding boss 83 through which a shaft 84 extends for rotational movement. A collar 85 is mounted on one end of the shaft 84 against which the gear blank 49 abuts when it is mounted in fixed relation to the shaft 84 by a nut 86. A brake mechanism 87 is provided on the opposite end of the shaft 84 and includes a brake drum 88 which is encompassed by a pair of arcuate brake bands 89 the lower ends of which are pivoted to an upstanding lug 91 by pins 92. The upper ends of the brake shoes 89 are extended at 93 and provided with apertures through which a stud 94 having a handle 95 on one of its ends extends to be threaded through a nut 96 fixed to one of the extensions. A spring 97 is positioned between the extensions 93 for releasing the bands from engagement with the drum 88 when the hand wheel 95 is moved outwardly of the nut 96. The brake 87 may be adjusted to require a considerable force to be applied to the teeth of the gear blank 49 to effect its rotation. This force is applied through the teeth of the cutter, one side of which are in engagement with one side of the teeth of the gear during one longitudinal passage of the cutter to thereby machine the one side of the gear teeth, the opposite side of the teeth being machined during the reverse movement of the cutter.

Referring to Figs. 10 and 11 it will be noted that I have provided laterally extending teeth on the cutter and the gear, in which construction the cutting edges 58 are disposed angularly from the vertical for effecting the cutting of the sides of the teeth. It is to be understood that the cutting operation may also be effected by procuring the lateral movement between the gear and the cutter, either by disposing the gear angularly to the movement of the cutter, as illustrated in Figs. 1 to 6 inclusive, or by mechanically effecting the lateral movement as illustrated in Fig. 7.

In the present arrangement the teeth of the cutter are spaced from each other a greater distance than the width of the teeth to be provided on the gear blank, as illustrated in Figs. 10 and 11, in order to provide gaps for receiving the roughed teeth which are adjusted downwardly the required distance before the cutting operation is commenced. Referring to Fig. 10, as the cutting teeth are moved to the left the left hand sides of the teeth engage the right hand sides of the teeth of the gear blank 49 for rotating the blank to the left and for machining the right hand sides of the teeth during the movement.

After the cutting tool 14 has reached the end of its stroke, it is moved in the opposite direction, as illustrated in Fig. 11, to have the opposite or right hand sides of the teeth engage the left hand sides of the teeth of the gear blank 49, to machine the opposite sides of the teeth into predetermined contour. The reciprocation of the cutter is continued until the exact tooth width obtains on the gear blank 49.

This method of roughing and finishing gears is capable of being extended through the employment of a circular cutter in place of the flat cutter herein described and illustrated. An arbor is provided for supporting and rotating the cutter which is substituted for the mechanism for longitudinally moving the cutting tool. The cutting tool, in the nature of a gear, may be built up from a plurality of blades having cutting sides as herein illustrated or a solid gear may be constructed as a cutting tool having the flanks of the teeth provided with lands and grooves for effecting the cutting edges employed for machining the sides of the gear teeth. In like manner the cutter having horizontally disposed teeth may be made from a single piece of material instead of from a plurality of blades as herein illustrated.

My cutting tool accurately machines teeth on a gear independent of the machine upon which it is supported and by which the relative movement between the gear and cutter is effected. The error heretofore introduced by the machine in the tooth shape and spacing during the generating operation is entirely eliminated and a comparatively simple, inexpensive machine may be employed for supporting and effecting the relative movement between my cutter and a gear blank.

While I have specified that the cutter is actuated to effect the machining of the gears, it is to be understood that the same result may be obtained by actuating the gear and/or its support across the cutting tool. In either case a gear having extremely accurate tooth profile and spacing is finished, or roughed and finished, by an operation which utilizes my cutting method.

The method herein claimed is a gear finishing operation in which the tooth form on the gear blank is produced by cutting metal from the working surfaces of the teeth of the gear blank without materially affecting the size and profile of the gear tooth by burnishing or a similar cold-working of the metal thereof in which some metal is incidentally removed as contemplated in the U. S. Patent No. 1,642,179 to Schurr, thereby expressly disclaiming the method of said Schurr patent from the scope of my claims.

While a certain limited amount of burnishing or polishing of the gear teeth may be done by the lands between the cutting edges of the tool teeth, the claims are limited to the method in which the final size and form produced on the teeth of the gear blank is a direct result of the cutting or shaving of the metal therefrom by the cutting edges of the tool and in which any burnishing action of the lands between the cutting edges in the tool teeth is only incidental and of no importance in producing the finished profile and size of the gear tooth.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. The method of finishing gears which comprises mating together a gear having roughed out teeth and a tool having teeth provided with substantially unrelieved cutting edges, rolling said tool and gear together to give the cutting edges of the tool a component of motion relative to the preformed faces of the gear teeth due to said rolling of the tool and gear, simultaneously traversing said cutting edges laterally of the gear teeth to provide a lateral component of motion of said cutting edges along said faces of said gear teeth, maintaining the portions of said cutting edges in contact with the faces of said gear teeth substantially parallel to the component of relative motion due to rolling and finishing said gear teeth faces by cutting the same to final size and profile by a plurality of simultaneous cuts by the lateral movement of said cutting edges relative to said gear teeth, while avoiding material burnishing thereof.

2. The method of finishing gears which comprises mating together a gear having roughed out teeth and a tool having teeth provided with substantially unrelieved cutting edges, rolling said tool and gear together one by the other to give the cutting edges of the tool a component of motion relative to the preformed faces of the gear teeth due to said rolling of the tool and gear, simultaneously traversing said cutting edges laterally of the gear teeth to provide a lateral component of motion of said cutting edges along said faces of said gear teeth, maintaining the portions of said cutting edges in contact with the faces of said gear teeth substantially parallel to the component of relative motion due to rolling and finishing said gear teeth faces by cutting the same to final size and profile by the lateral movement of said cutting edges relative to said gear teeth, while avoiding material burnishing thereof.

3. The method of finishing gears which comprises mating together a gear having roughed out teeth and a tool having teeth provided with substantially unrelieved cutting edges, operating said gear and tool, including rolling the tool and gear together, to give the cutting edges of the tool teeth a lateral component of motion relative to the preformed faces of the gear teeth and a second component of motion due to the rolling between the gear and tool, maintaining the cutting edges of the tool teeth in contact with the faces of the gear teeth substantially parallel with the component of motion due to rolling and finishing said gear teeth faces by cutting the same to final size and profile by the lateral movement of said cutting edges relative to said gear teeth, while avoiding material burnishing thereof.

4. The method of finishing gears which comprises mating together a gear blank having roughed out gear teeth formed thereon with a tool having teeth conjugate to the teeth to be produced on the gear being finished, the working surfaces of the teeth of said tool having grooves formed therein extending from the roots to the crests thereof whereby to provide substantially unrelieved cutting edges lying in the working surfaces of said tool teeth, urging said gear relatively toward said tool radially of said gear and driving one by the other to cause rotation of said gear in meshing engagement with said tool, said rotation serving to introduce a component of relative slippage between the engaged working faces of the teeth of said gear and tool in a direction generally parallel to said cutting edges, simultaneously introducing a component of relative movement between the engaged working surfaces of the teeth of said gear and tool in a direction generally perpendicular to said cutting edges and shaving metal from the working surfaces of said gear blank teeth with said cutting edges by said last mentioned component of movement while avoiding material burnishing.

5. The method of finishing gears which comprises mating together a gear blank having roughed out gear teeth formed thereon with a tool in the form of a rack having teeth conjugate to the teeth to be produced on the gear being finished, the working surfaces of the teeth of said rack having grooves formed therein extending from the roots of the teeth to the crests thereof whereby to provide substantially unrelieved cutting edges lying in the working surfaces of said rack teeth, urging said gear toward said tool radially of said gear and reciprocating said rack to cause rotation of said gear in meshing engagement therewith, said rotation serving to introduce a component of relative slippage between the engaged working faces of the teeth of said gear and tool in a direction generally parallel to said cutting edges, simultaneously introducing a component of relative movement between the engaged working surfaces of the teeth of said gear and tool in a direction generally perpendicular to said cutting edges and shaving metal from the working surfaces of said gear blank teeth with said cutting edges of said last mentioned component of movement while avoiding material burnishing.

WILLIAM F. DALZEN.